United States Patent [19]

Sussingham

[11] Patent Number: 5,718,587
[45] Date of Patent: Feb. 17, 1998

[54] VARIABLE GRAVITY SIMULATION SYSTEM AND PROCESS

[75] Inventor: Joseph Christopher Sussingham, Lakeland, Fla.

[73] Assignee: Joseph C. Sussingham, Lakeland, Fla.

[21] Appl. No.: 520,054

[22] Filed: Aug. 28, 1995

[51] Int. Cl.⁶ .................................................. G09B 9/00
[52] U.S. Cl. ............................................. 434/34; 434/55
[58] Field of Search .......................... 434/34, 55, 59; 472/129, 128, 130

[56] References Cited

U.S. PATENT DOCUMENTS

| | | | |
|---|---|---|---|
| 3,010,219 | 11/1961 | Schueller | 434/34 |
| 3,161,968 | 12/1964 | De Boy | 434/34 |
| 3,516,179 | 6/1970 | Dane | 434/34 |
| 3,534,485 | 10/1970 | Simpson | 434/34 |
| 4,487,410 | 12/1984 | Sassak | 434/34 |
| 4,678,438 | 7/1987 | Vykukal | 434/34 |
| 4,752,383 | 6/1988 | McKay | 209/164 |
| 5,137,372 | 8/1992 | Diggins | 434/34 |

OTHER PUBLICATIONS

J. Schefter, "World's Most Way Out Job", Feb. 1982, Popular Science NASA, Self–Contained Neutral Buoyancy Suit, vol. 10, No. 1, MSC–20424, NASA Tech Briefs.

*Primary Examiner*—Paul J. Hirsch

[57] ABSTRACT

A variable gravity simulator for giving a test subject, such as an astronaut, six degree freedom of movement in a variety of effective gravities by using a nearly uniform gas/liquid mixture as an immersion medium. This technique retains most of the benefits of conventional methods of varying effective gravity through immersion in a liquid yet greatly reduces the most serious drawback by reducing the resistance to all movement due to the immersion liquid's viscosity.

3 Claims, 3 Drawing Sheets

VARIABLE GRAVITY SIMULATION SYSTEM AND PROCESS

BACKGROUND OF INVENTION

1. Field of Invention

This invention relates to a system and process that can vary the effective gravity felt by an individual or mechanism for extended periods of time on earth under controlled conditions.

2. Description of Prior Art

The United States' interest in simulating the conditions found in space became an area of great interest with the birth of the U.S. Space Program. It was recognized early on that in order to ensure the safety and success of manned missions, realistic training environments would have to be reproduced on earth. Several areas of simulation received attention.

The harsh conditions of space and the vacuum of space were reproduced for astronaut training using methods and equipment described in U.S. Pat No. 3,010,220, issued 28 Nov. 1961 to Schueller and U.S. Pat. No. 3,534,485, issued 20 Oct. 1970 to Simpson. These patents did not address the less than earth gravity conditions (less than 1 G) that astronauts encounter during missions.

Methods to reproduce the less than 1 G conditions that astronauts would be subjected to have been developed. Drop tubes, aircraft flying parabolic arcs, and rockets launched on suborbital profiles have all been used to study the effects of less than 1 G. Using these methods the less than 1 G conditions can only be reproduced for relatively short periods. To date, methods to encounter less than 1 G conditions for extended periods on earth are not possible. The conditions, however, can be simulated.

One such method is to place the trainee in a mechanical device that affords the individual six degree freedom of movement. This device is described in U.S. Pat. No. 3,516,179, issued 23 Jun. 1970 to Dane. The use of this device is not extensive since the direct application to training is limited.

A more popular method developed decades ago and still in widespread use today is the simulation of weightlessness by creating a state of neutral buoyancy (null gravity) for an individual submerged in a large pool of water. Such a simulation system is described in a February 1982 article from the magazine Popular Science titled "World's Most Way-Out Job". A streamlined version of the same method is described in the NASA Tech Briefs, Jan/Feb 86, Vol. 10, No. 1, MSC-20424, titled "Self-Contained Neutral-Buoyancy Suit". A modified version that allows an astronaut to practice in null gravity conditions at no more than atmospheric pressure is described in U.S. Pat. No. 4,678,438, issued 7 Jul. 1987 to Vykukal. All of these techniques afford the trainee the benefit of freedom of movement, but none address the issue of resistance to all movement due to the viscosity of water using the water immersion procedure.

BRIEF DESCRIPTION OF THE INVENTION

It is the purpose of this invention to provide a system and process that can provide a reduced gravity training environment for astronauts that affords a tremendous advantage by decreasing the viscosity effects of the immersion medium while still retaining the freedom of movement benefit. This invention also provides a way to quickly and easily vary the effective gravity between 0 and 1 G that a trainee is subject to. Lastly, this method accomplishes the simulation using significantly less liquid. Hence, the difficulties associated with pressure differentials when an individual is submerged under a liquid are greatly reduced.

These benefits are achieved using a novel approach to enhance the liquid immersion technique. This variable gravity simulation system and process consists of a large pool of a liquid. This pool of liquid has a porous floor and a small space between the porous floor and the sealed bottom of the pool. Gas is introduced into the space between the sealed pool floor and the porous pool floor. The gas is under pressure and rises into the pool through the porous floor. Gas pressure is supplied by a commercial gas compressor. It travels via gas lines through an gas filter, a heating unit, a flow meter, a one wax valve, a drain valve, and enters the tank's sealed floor through three openings. Gas rises through the porous floor and enters the liquid in the form of tiny bubbles. A frothing agent can be added to the liquid in order to reduce its surface tension. The combining of rising gas bubbles is inhibited due to the liquid's reduced surface tension. By varying the hole size on the porous floor and the surface tension of the liquid, the bubble size and consistency can be regulated. The control of bubbles entering a liquid is not a new technology. Reference U.S. Pat. No. 4,752,383 filed 5 Aug. 1986 by McKay, Jordon, and Foot. This invention's novel method and use is a revolutionary approach to varying gravity simulation.

Using this system and process a nearly uniform liquid foam can be created. By varying the flow rate of gas and the surface tension of liquid, the effective gravity induced can be controlled. By varying the temperature of the gas entering the tank the temperature of the liquid foam can also be controlled.

Liquid foam is partly gas, so the density of foam is less than the density of the liquid. Therefore, the pressure an individual is subjected to while immersed in the liquid foam is less then the pressure an individual is subjected to when submerged in a similar volume of the liquid. Since the foam is partly gas, the viscosity of the liquid foam is much less than the viscosity of the liquid. Resistance to all movement is, therefore, reduced. The effects of reduced gravity on human or mechanical performance can be approximated more realistically using a liquid foam rather than using strictly a liquid.

DETAILED DESCRIPTION OF THE PREFERRED EMBODIMENT

Figure 1:
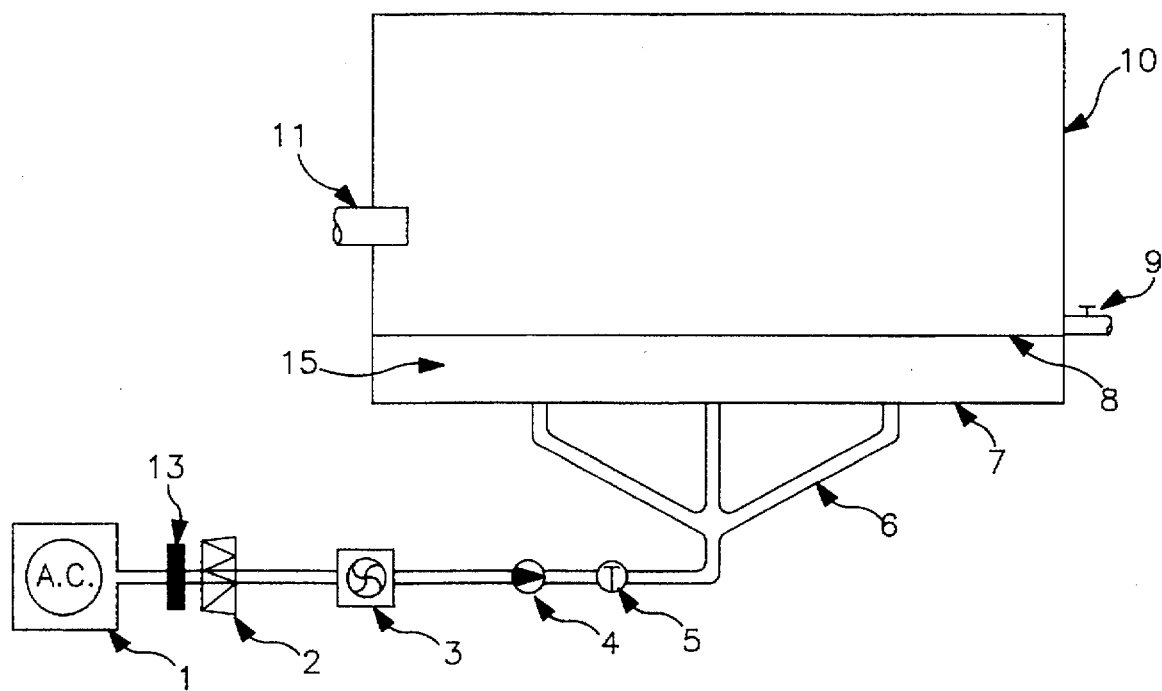
FIG. 1. Side view of the variable gravity simulation system.
Figure 2:
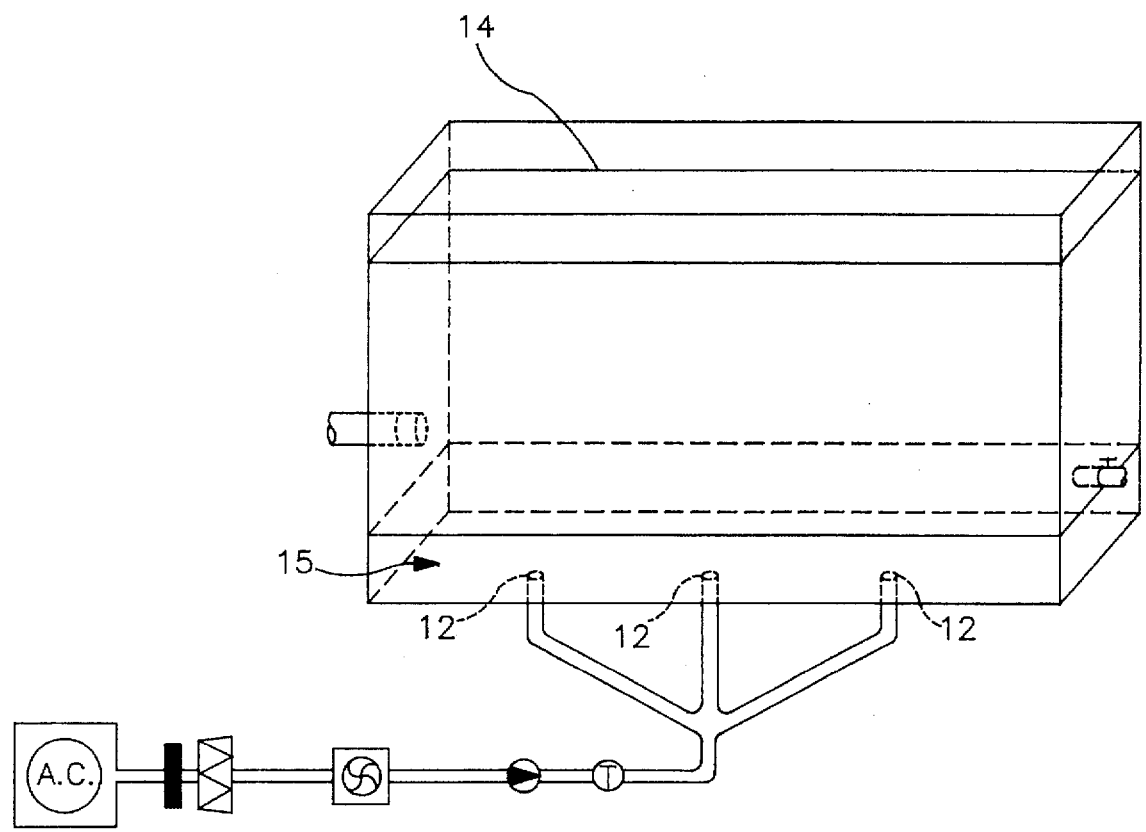
FIG. 2. Angled view of invention.
Figure 3:
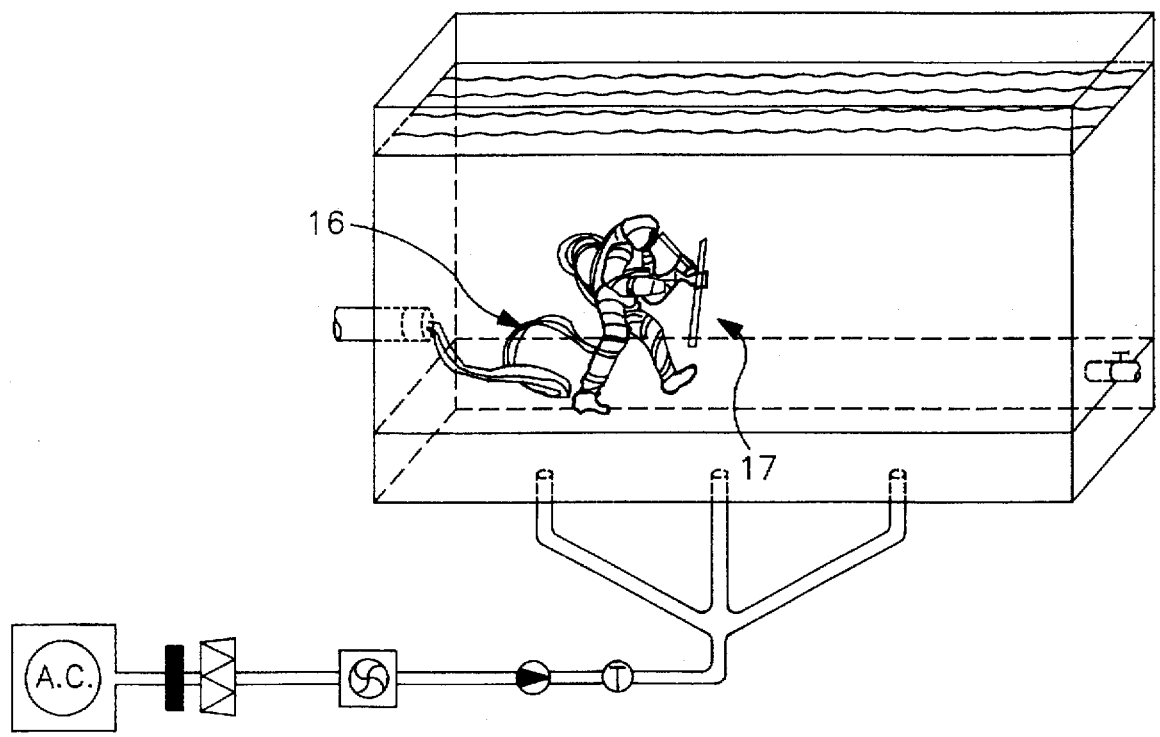
FIG. 3. Angled view of invention showing an astronaut in training.

FIGS. 1, 2, and 3. show the varying gravity simulation invention. The invention consists of gas compressor 1, which supplies pressurized gas, preferably air, to the system. Gas travels in gaslines 6 through a gas filter 13, a gas heater 2, and a flow meter 3. Gas then travels through a one way valve 4 and a drain 5. The gas then continues through gas lines 6 and enters the pool 10 through openings 12 in the solid floor 7. Gas spreads out in dispersion chamber 15 and enters the liquid, preferably water, via the porous floor 8. When needed, the liquid may be drained out of pool 10 by opening drain 9. Any liquid that has seeped through the porous floor 8 into dispersion chamber 15 and gas lines 6, can be drained by opening drain 5 when gas pressure is not on the system. Air and cooling lines 16, that are needed if the training astronaut is wearing a pressure suit 17, enter the pool 10 through port 11.

As mentioned earlier, the frothing agent, preferably isopropyl alcohol, and gas flow are varied to produce a consistent liquid foam for the desired gravitational simulation. The percent of frothing agent to the percent of liquid varies depending on frothing agent, liquid, and gas used. For the preferred embodiment, 0.01% to 10%, preferably 0.5% to 2.0% isopropyl alcohol is added to the liquid water while the gas air enters the pool as described above at a rate between 180 cubic feet per hour (CFH) and 1800 CFH, preferably 200 CFH to 800 CFH. The top surface of the liquid foam 14 is also depicted.

Gravitational conditions from 0 G to nearly 1 G can be quickly and easily simulated. Visibility in the foam is virtually non-existent. This is a known and unavoidable side effect of creating a liquid/gas medium that has, comparibly, the same effects on human or mechanical performance as those effects actually encountered by astronauts or machines in space. It is therefore a known limitation of this variable gravity simulation and process invention that only training that is not visibility dependent will be practical.

I claim:

1. A method for simulating the reduction of gravity for training comprising;

providing a tank capable of being filled with water and a frothing agent, said tank having a porous floor and a means for introducing gas, said gas entering said tank through said porous floor producing a liquid foam, regulating the density of said liquid foam by regulating the amount of said frothing agent added to the water, and controlling the rate at which said gas enters said tank through said porous floor, thus controlling the simulation of gravity.

2. A method for simulating the reduction of gravity for training according to claim 1, wherein a gas compressor is used to introduce the gas, said gas travels from said gas compressor through gas lines through a gas filter, a heating unit, a flow meter, a one way valve, and a drain valve before entering said tank through said porous floor.

3. A method for simulating the reduction of gravity for training according to claim 2, wherein said gas is air.

\* \* \* \* \*